Nov. 14, 1961 A. B. MILLER 3,009,133

AUTOMATIC CHANGEOVER FOR CARRIER CIRCUITS

Filed June 25, 1956 6 Sheets-Sheet 1

INVENTOR.
Alfred B. Miller
BY
W. L. Stout.
HIS ATTORNEY

INVENTOR.
Alfred B. Miller
BY W. L. Stout
HIS ATTORNEY

Nov. 14, 1961 A. B. MILLER 3,009,133

AUTOMATIC CHANGEOVER FOR CARRIER CIRCUITS

Filed June 25, 1956 6 Sheets-Sheet 3

INVENTOR.
Alfred B. Miller
BY W. L. Stout
HIS ATTORNEY

Nov. 14, 1961 A. B. MILLER 3,009,133

AUTOMATIC CHANGEOVER FOR CARRIER CIRCUITS

Filed June 25, 1956 6 Sheets-Sheet 4

INVENTOR.

Alfred B. Miller.

BY W. L. Stout.

HIS ATTORNEY

Nov. 14, 1961 A. B. MILLER 3,009,133

AUTOMATIC CHANGEOVER FOR CARRIER CIRCUITS

Filed June 25, 1956 6 Sheets-Sheet 5

INVENTOR.
Alfred B. Miller.
BY W. L. Stout
HIS ATTORNEY 3,009,133

AUTOMATIC CHANGEOVER FOR CARRIER CIRCUITS

Alfred B. Miller, Edgewood, Pa., assignor to Westinghouse Air Brake Company, Wilmerding, Pa., a corporation of Pennsylvania Filed June 25, 1956, Ser. No. 593,552
6 Claims. (Cl. 340—163)

Figure 1A:
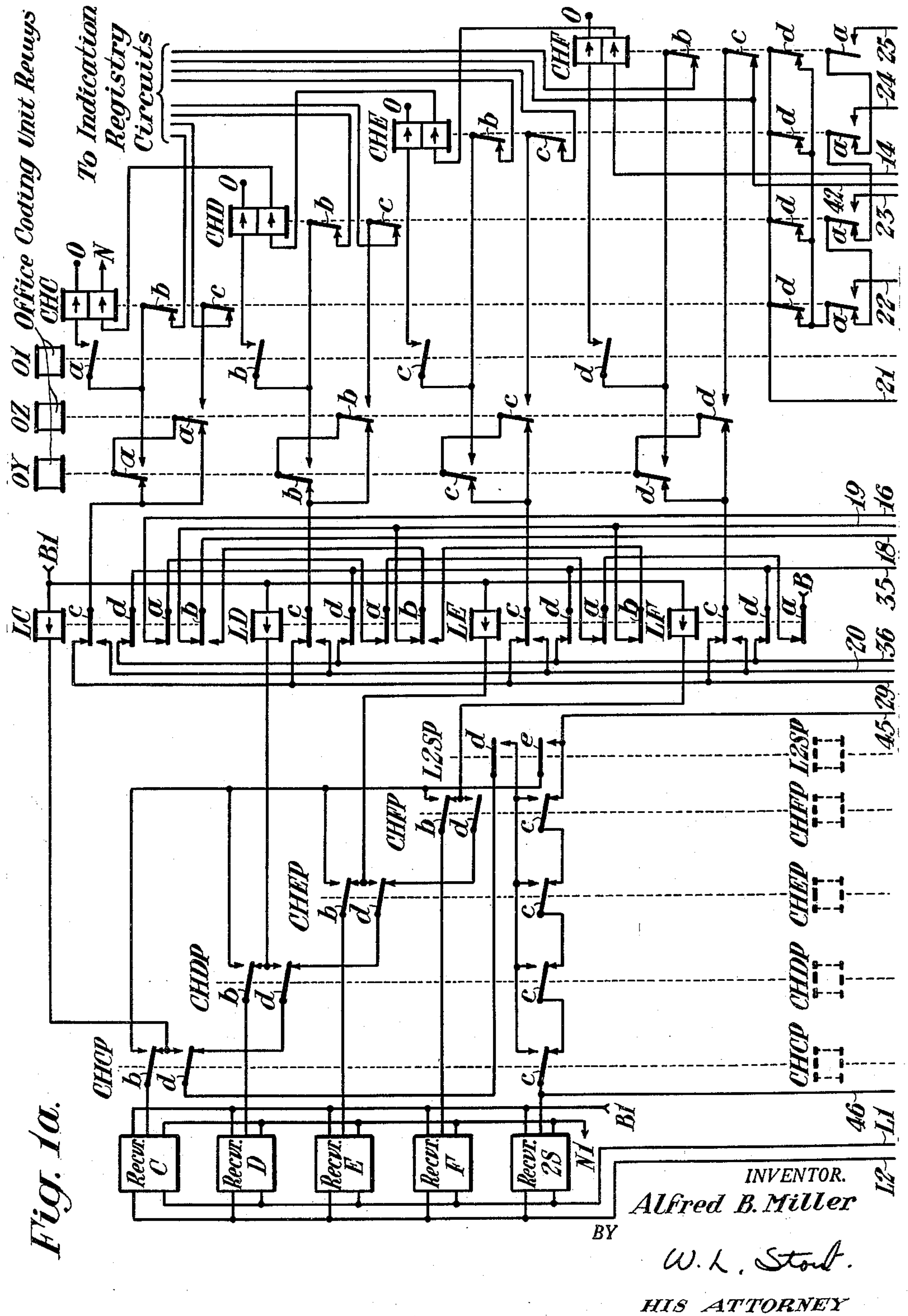

My invention relates to automatic changeover for carrier circuits. More particularly, my invention relates to means for substituting a spare carrier channel for a defective carrier channel in a carrier current remote control system.

To promote efficiency of operation, various railroads have adopted the practice of remotely controlling several interlockings from one office location, this remote control being accomplished by any one of several well known remote control systems. In such installations, each interlocking requires many control functions and usually provides even a larger number of indications to the operator. For the sake of economy, carrier current channels have come into use to carry these control functions and return indications between the interlocking and the office location, especially where the remote control system is of the coded type. This practice saves a number of line wires since the various carrier currents of different frequencies may be transmitted over a single pair of line wires. This saving of line wires reduces the cost of installation, especially where several interlockings in succession are controlled from one office location. At least one type of remote control system in use requires four carrier channels in each direction for each interlocking location controlled. It is to be seen that a considerable saving of line wires results when a single pair of wires is used to carry all of the carrier currents.

However, in such a system, the failure of one of the carrier current operating channels is a serious disadvantage. The failure of a control channel, that is, a control channel becoming inoperative, results in delays to trains passing through the interlocking since the various routes cannot be established by the operator while a portion of his control system is inoperative. When an indication channel fails, various indications usually transmitted from the interlocking to the office location will be missed. This lack of information makes it virtually impossible for the operator to efficiently control the passage of trains since he does not know the full situation and the condition of all of the equipment and tracks at the interlocking. However, if some means may be provided for the immediate substitution of a spare carrier channel for the otherwise defective channel, this handicap in the operation of the interlocking may be overcome.

It is therefore an object of my invention to provide an automatic changeover for carrier circuits in a remote control system.

Another object of my invention is to provide a means for automatically replacing a defective carrier current channel by a spare carrier channel provided for that purpose.

Still another object of my invention is to provide, in a multi-channel carrier current remote control system, a means for automatically replacing the equipment at each end of a defective channel with spare equipment to immediately re-establish the channel as an operative channel.

A further object of my invention is to provide, in a carrier current remote control system, a spare carrier channel for each direction of transmission which automatically replaces a defective channel of the corresponding direction without interfering with other channels operating in either direction.

Still another object of my invention is to provide, in a carrier current remote control system, for the automatic changeover from a defective carrier channel to a spare operative channel in one direction of transmission without affecting a similar changeover which may be simultaneously occurring for the carrier currents transmitting in the other direction.

Still a further object of my invention is to provide, in a carrier current remote control system, for a simultaneous changeover to spare carrier channels to replace a defective channel in each direction.

Other objects and features of my invention will become apparent as the specification progresses.

In practicing my invention, I provide sufficient apparatus to establish a spare carrier current channel in each direction between the office, that is, the control location, and the station or field location. These spare carrier channels are normally energized, that is, the carrier current is normally flowing from the transmitter end to the receiver end.

In the form of my invention shown, the failure of any one of the indication channels, that is, the channels from the station to the office, causes the initiation of three successive codes. During the first code, the defective indication channel is detected at the office and the corresponding detector relay is energized. At the end of the first code a corresponding changeover relay at the office is also energized. During the second successive code, this information is transmitted to the station to cause a substitution at that location of the stand-by apparatus for the apparatus of the defective carrier channel. During this second code, the changeover action is completed at both the office and the station, the spare channel being substituted for the defective channel. During the third of the successive codes, the detector relay at the office which was previously energized is released and all of the indications normally carried by the defective channel are now recorded using the spare channel for transmission of this information from the station to the office.

The failure of one of the control carrier channels will be detected only when a code is initiated, since the control channels are not normally energized so that control carrier current is not normally present in the line circuit. Upon the initiation of any code following the failure of a control channel, the lack of a proper answer-back from the station equipment halts the progress of the code during the initial step. Because of the failure of one of the carrier currents to reach the station, the station apparatus functions to energize a changeover relay corresponding to the defective channel. This changeover relay prepares the substitution circuits for replacing the apparatus of the defective channel with the apparatus of the spare channel at the station. Meanwhile, the office apparatus, with the progress of the code halted, initiates a hunting action to determine which channel is defective. This is a coordinated action of several relays by which the various control channels are tested in sequence. When the defective channel is located and eventually replaced at the office during this hunting action, the substitution circuits at the station are then completed. This permits the station apparatus to transmit a proper answer-back to the office, which then allows the control code to continue with the spare channel substituted for the defective carrier channel. Once completed, any changeover, either of the control or indication channels, holds until a manual reset is initiated by the operator. During this period when the spare channel is in service, the defective apparatus is connected to the spare line relays at both office and station to provide an indication of the repair of the defective channel. After this channel is repaired and is so indicated, the operator initiates the above mentioned manual reset action.

I shall now describe one form of apparatus embodying my invention and shall then point out the novel features thereof in the appended claims.

Referring now to the drawings, FIG. 1 which comprises FIGS. 1*a* to 1*f*, inclusive, is a diagrammatic showing of a carrier current remote control system embodying one form of my invention.

Figure 1B:
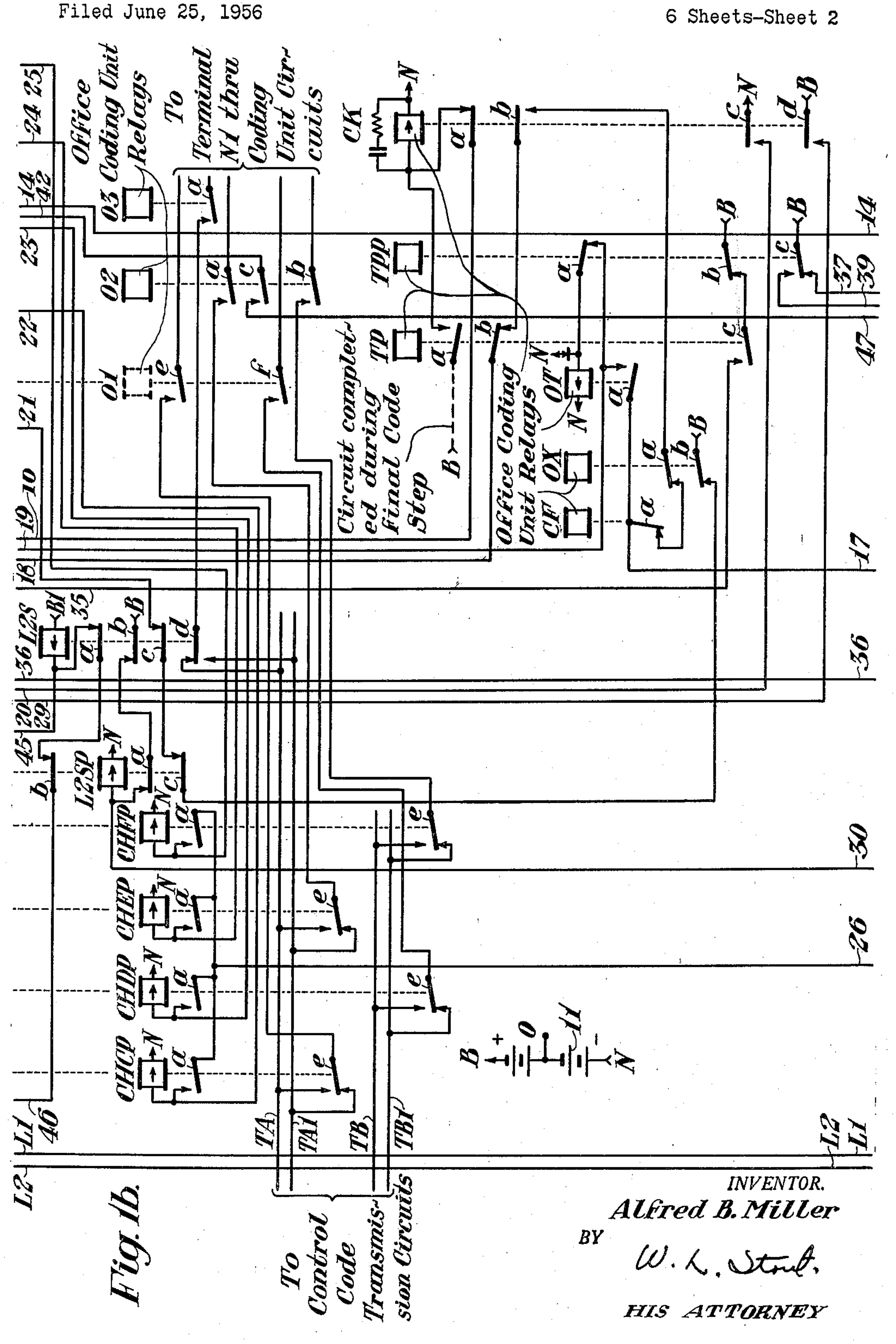
Figure 1C:
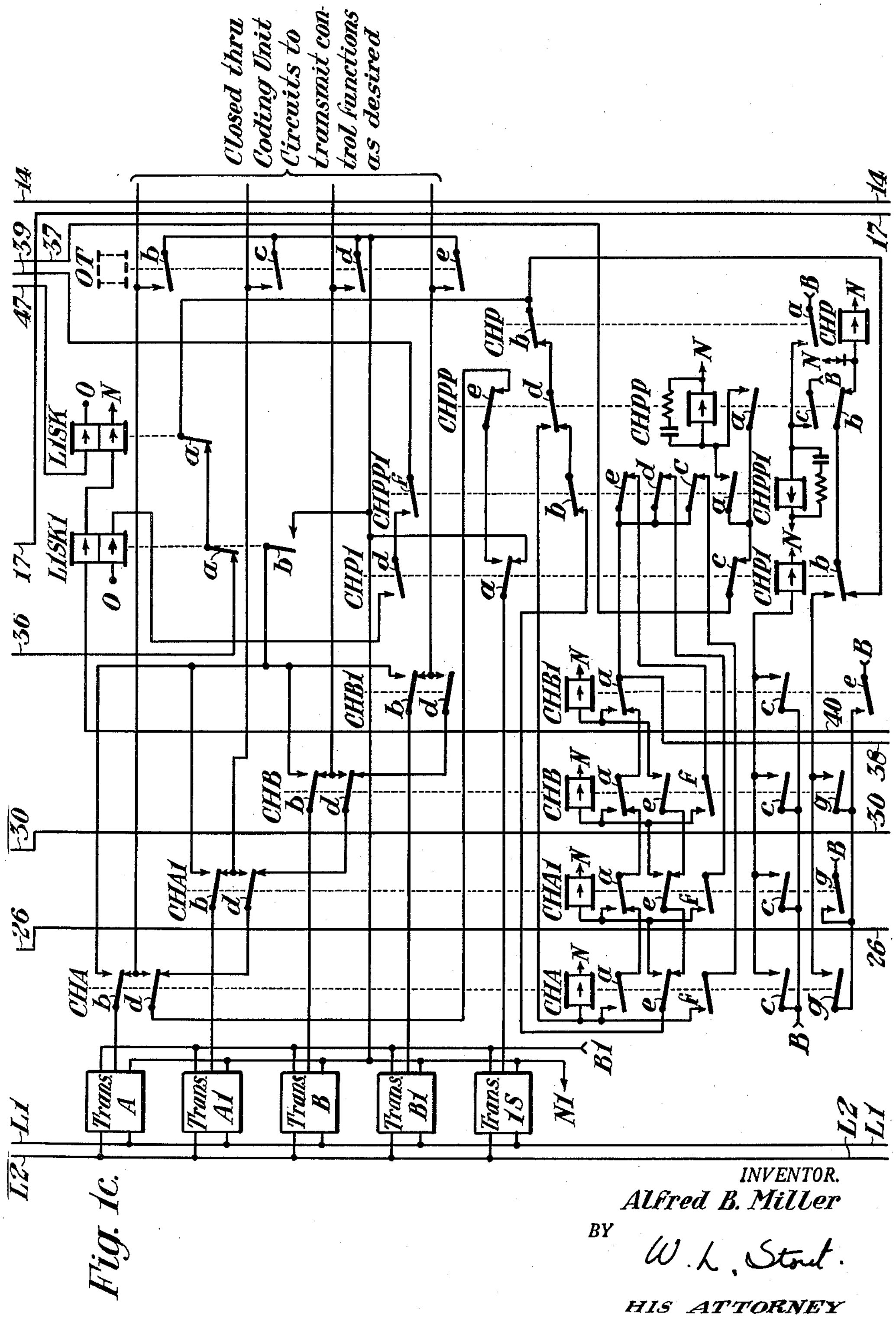
Figures 1D, 2:
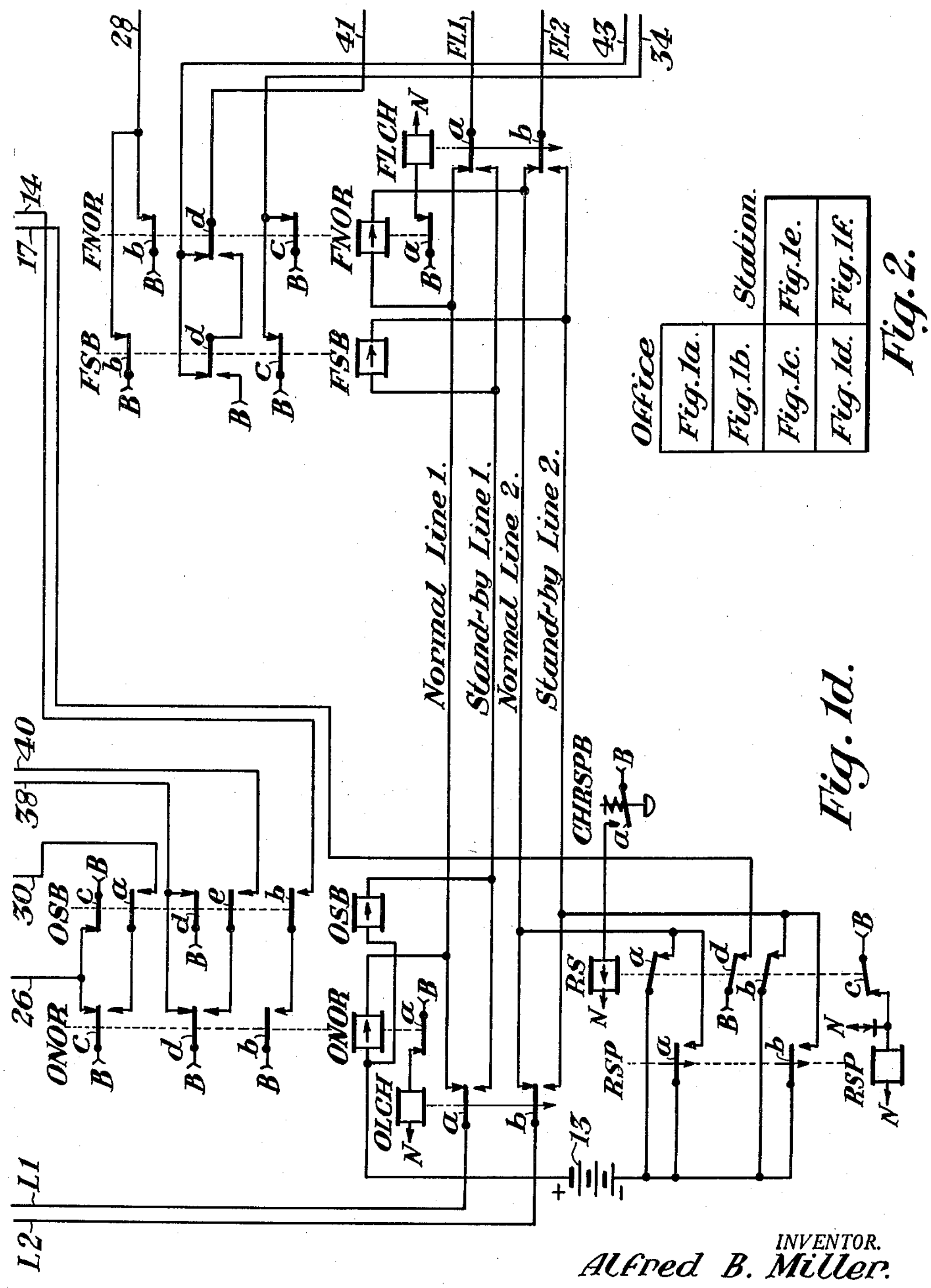

FIG. 2 of the drawings is an assembly chart for FIGS. 1*a* to 1*f*, inclusive.

In each of the drawings, similar apparatus is designated by similar reference characters.

Figure 1E:
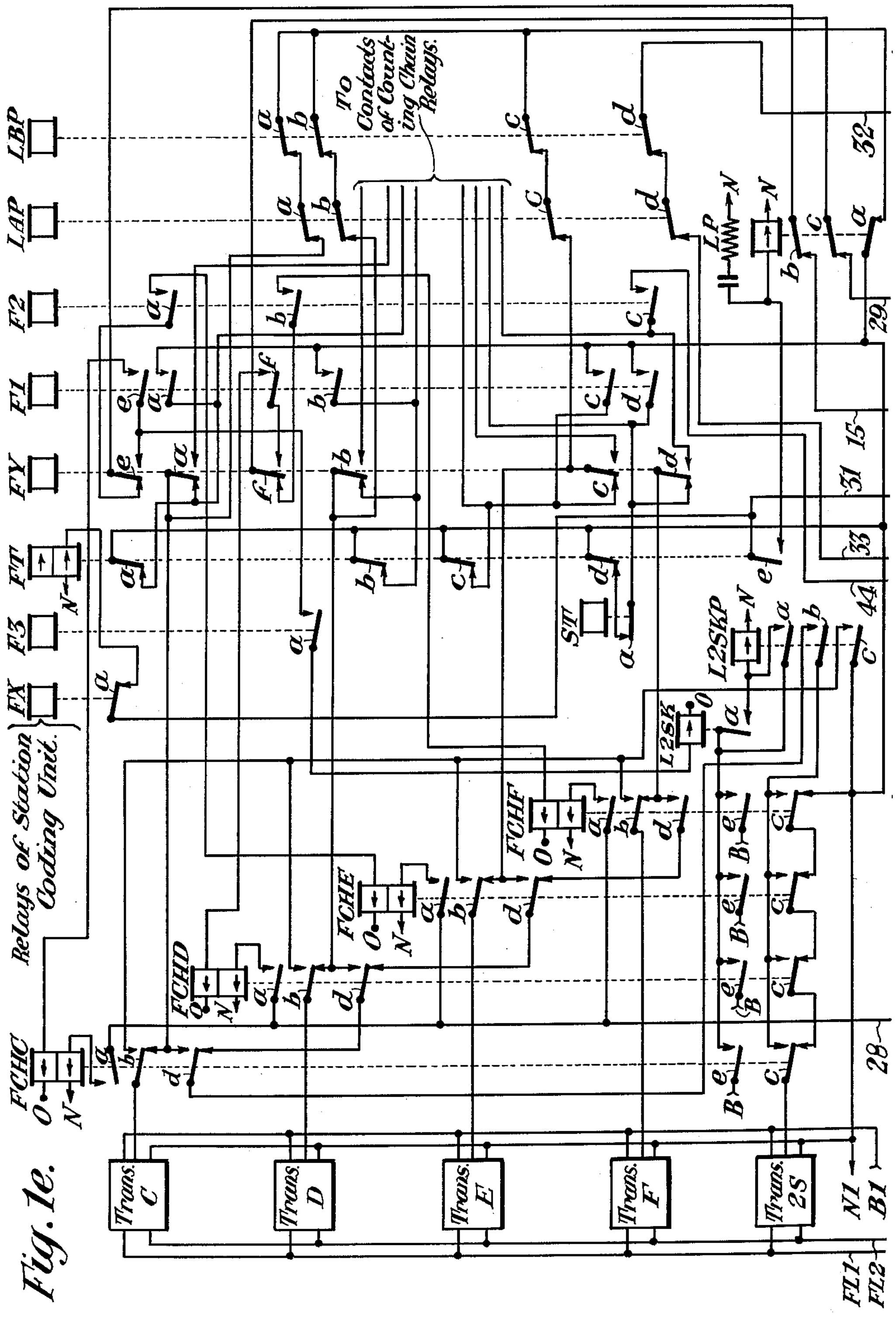
Figure 1F:
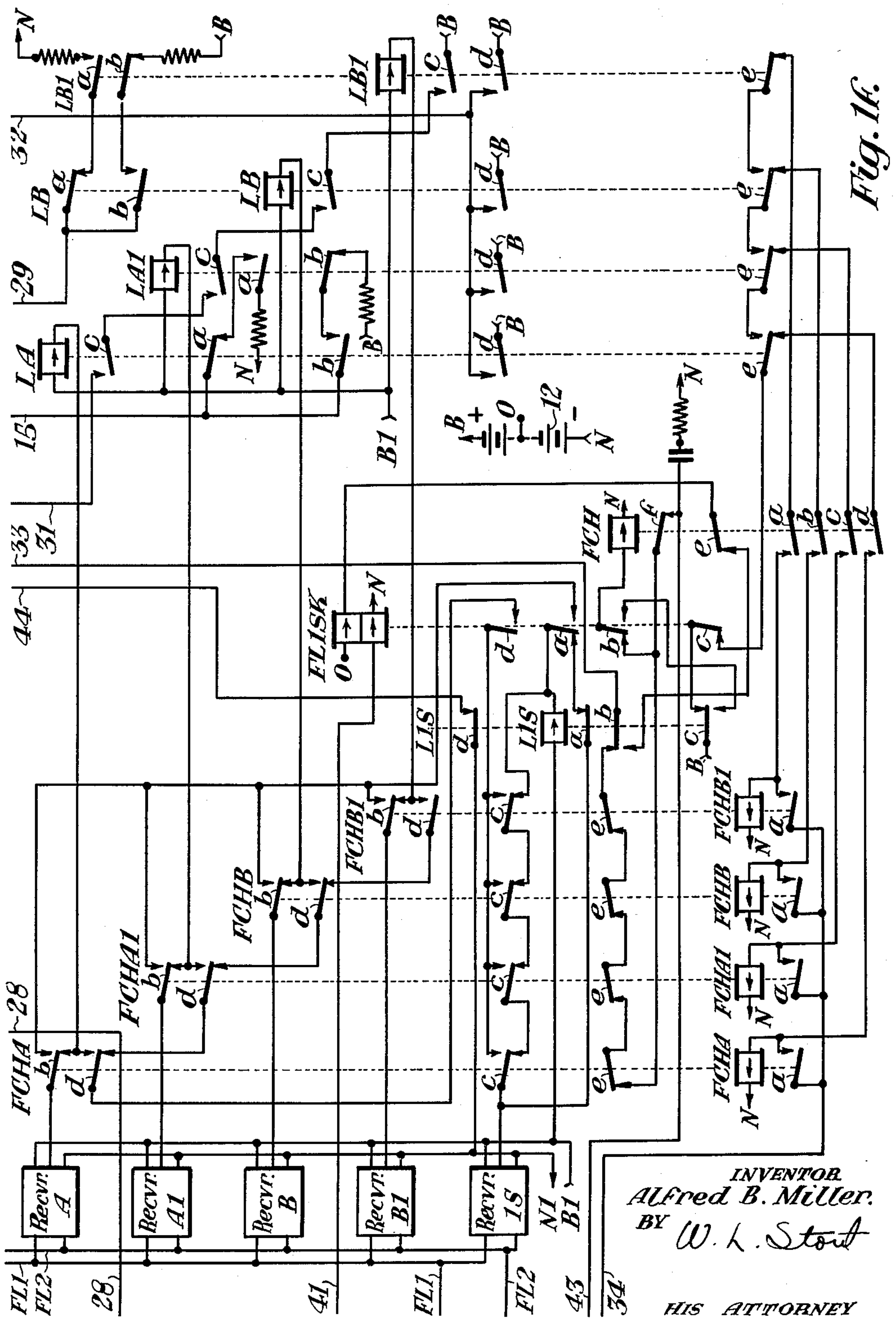

Referring now to FIGS. 1*a* to 1*f*, inclusive, these drawnigs when assembled according to the chart shown in FIG. 2 provide a circuit arrangement at an office location and at a single station for one form of carrier changeover embodying my invention. In these drawings, the office portions of the circuits are shown in FIGS. 1*a*, 1*b*, 1*c* and the left-hand portion of FIG. 1*d*, while the station circuits are shown in FIGS. 1*e* and 1*f* and the right-hand portion of FIG. 1*d*. The office and station are shown connected in FIG. 1*d* by a line wire circuit comprising the normal line wires 1 and 2 and the stand-by line wires 1 and 2. It is to be understood, however, that these line wires may be replaced by any other well known type of communication link such as radio, microwave, or very high frequency carrier currents transmitted over a physical channel. The one characteristic which these various types of communication links must have in common is the capability of carrying or transmitting carrier currents having frequencies of the order used in the carrier current remote control system.

The office and the station are each provided with a local source of low voltage, direct current energy, this source preferably being a battery such as local battery 11 shown in FIG. 1*b* and local battery 12 shown in FIG. 1*f*, the former being the office source and the latter, the station source. Each of these batteries is provided with a positive terminal B, a negative terminal N, and a center tap terminal O. Elsewhere in the various parts of FIG. 1 connections to the corresponding battery terminals are indicated only by the reference characters B, N, or O, each such reference character designating the corresponding terminal of the battery at that location. Throughout this description, it will be considered that the direct current flows from positive terminal B to negative terminal N of each battery. Current flow is also considered as being from terminal B to terminal O and from terminal O to terminal N when such connections are used.

Both the office and the station are also provided with a source of higher voltage direct current energy suitable for supplying such voltages as required by the carrier current transmitters and receivers used herein. This source of high voltage energy is not shown as any well known type of power supply suitable for such use may be provided. However, the positive and negative terminals of this power source at each location are indicated by the reference characters B1 and N1, respectively.

Certain of the relays shown in the various portions of FIG. 1 are of the magnetic stick type. As shown in these drawings, the windings of such relays are marked with an arrow, which may be considered to show the direction of normal current flow. One such relay, for example, is the detector relay CHC shown in FIG. 1*a*. As a further aid in distinguishing these relays, the contact armatures of such relays are shown in a generally vertical position. The manner of operation of these relays is such that when current flows in either or both windings in the direction of the arrow, the relay armatures are operated to their left-hand position, closing left-hand or normal contacts. When current flows in either or both windings of these relays in the direction opposite to the arrow, the relay armatures are operated to their right-hand position closing right-hand or reverse contacts. When current is removed from the windings of these relays, the armatures remain in the position to which they were last operated by current flow.

Certain other relays shown in these drawings are of the biased type, for example, the line relay LC shown in FIG. 1*a*. The windings of these relays are marked with an arrow, which as before indicates the direction of normal current flow. However, to aid in distinguishing these biased relays, the armatures are shown in a generally horizontal position. When current flows through the winding of a biased relay in the direction of the arrow, the relay armatures are picked up closing front contacts. When current flows through these windings in the direction opposite to the arrow or when the relays are deenergized, that is, no current is flowing through the winding, the armatures are biased to return to their released position closing back contacts. In other words, these biased relays are properly energized to pick up their armatures closing front contacts only when the current flow is in the direction of the arrow shown in the winding.

For the purposes of this present description, the changeover system of my invention is shown applied to a coded remote control system similar to that disclosed in Letters Patent of the United States No. 2,398,588, issued to me on April 16, 1946, for a Remote Control System. As shown herein, this coded remote control system is modified to provide for the use of carrier currents in each direction over two line wires, instead of the three wire, direct current line circuits shown in the patent. The actual details of the code system are not part of my present invention and are only sufficiently shown and described to permit an understanding of the changeover system. In thus simplifying the showing in the drawings, only the operating windings of the relays of the code system are shown except where the details of my present invention enter into the control circuits for these relays. A brief review of the operation of the various relays of the code system follows shortly, but for a complete understanding and showing of the system, reference is made to the above-mentioned patent.

In FIG. 1*a*, the step producing relays OY and OZ of the office coding unit are shown. During a code, these relays alternately operate between their reverse and normal positions to control the progression of the counting chain of the coding unit. Upon the initiation of any code, relay OY operates to its normal position, or holds in that position, while relay OZ operates to its reverse position, or holds in that position. Thereafter during the code, relay OZ operates to its normal position on the odd numbered steps and to its reverse position on the even numbered steps of the code. Relay OY meanwhile operates to its reverse position on the odd numbered steps and to its normal position on the even numbered steps. These relays also serve to segregate the transmission circuits and the indication registry circuits over the chain relays so that only one transmission or registry circuit will be effective at any one time. However, this function of these relays does not enter into an understanding of my present invention.

Three relays of the counting chain of the office coding unit are shown, relay O1 in FIG. 1*a* and relays O2 and O3 in FIG. 1*b*. It is believed unnecessary to show more of the counting chain relays since they do not enter into an understanding of the operation of the changeover system. Each chain relay operates once during each code, starting with relay O1 which picks up on the starting step. These relays pick up and release sequentially, as the coding action progresses, to prepare circuits for the transmission of control information and for the registry of indication information on their respective steps. The last chain relay, which operates during the last code step, also closes the circuit to pick up a code check relay CK to terminate the coding action as will be more fully explained hereinafter.

The office transmitter relay OT is shown in FIG. 1*b*. This relay picks up and releases to produce the on and off periods, respectively, of the starting step. It picks up at the start of any coding action only to condition the office equipment for code progression and to apply, in the present system, all four control carrier currents to the line circuit to condition the field equipment for code progression. The pickup and stick circuits for this relay are shown in detail since their operation enters into the understanding of the system of my invention. However, the complete discussion of these circuits will be given hereinafter during the operational description of the system. It should be noted here, however, that relay OT releases when its repeater relay TPP picks up during the starting step upon the reception of the answer-back indication from the station.

Also shown in FIG. 1*b* is the operating winding of the office check relay OX. This relay picks up when relay OT has closed its front contacts during the starting step and thereafter remains held up, during the entire coding action, by a stick circuit. This relay checks that the operating circuits for step producing relays OY and OZ are always effective and releases to stop code progression if any one of the operating circuits of these step producing relays fails to function properly. The code failure relay CF, the operating winding of which is also shown in FIG. 1*b*, remains in its normal position during normal coding action and operates to its reverse position only if code progression fails to continue properly.

Again in FIG. 1*b*, the operating windings of the transmitter repeater bridging relay TP and the slow reelase repeater of this bridging relay, the relay TPP, are shown. The first of these two relays picks up after transmitter OT and check relay OX have picked up during the starting step. Relay TP is held up during the coding action by repeated impulses of energy supplied over a stick circuit by various relays of the coding unit. This relay maintains the operating circuits for the step producing and the chain relays during normal coding action and releases only during the reset step to restore the office equipment to its non-coding condition. Relay TPP picks up when the answer-back indication is obtained from the field during the starting step. This relay, upon picking up, allows the progression of the coding action to continue and it remains held up as long as relay TP remains in its energized position. Relay TPP must be in its released position for a new coding action to start.

At the station location shown in FIGS. 1*e* and 1*f*, the relays of the station coding unit are similar to those of the office unit. For example, step producing relays FY and FZ function in a manner similar to relays OY and OZ of the office coding unit. However, relay FZ is not here shown since its contacts do not enter into the operation of the carrier changeover system of my invention. The check relay FX is similar in operation to relay OX of the office coding unit. This relay picks up during the starting step if all four contol line relays pick up indicating that all four carrier currents from the office have been received. It normally holds up during the coding action and stops code progression if released in case some failure occurs. The counting chain relays F1, F2, and F3 are part of the field counting chain which is similar in operation and function to the counting chain of the office coding unit. The code termination relay FT occupies its normal position during at-rest conditions to maintain the four indication carrier currents on the line during the non-coding condition of the equipment. This relay is operated to its reverse position during the starting step by the reception of four control carrier currents from the office and remains reversed until the reset step. The control circuit including the lower winding of relay FT is shown and will be discussed hereinafter during the description of the operation of the apparatus.

The operating windings of the bridging line repeater relays LAP and LBP are also shown. Relay LAP is energized over contacts of line relays LA and LA1 during the starting step and then remains held up during the coding action by repeated impulses of energy supplied over contacts of these line relays. Likewise, relay LBP is energized over contacts of line relays LB and LB1 and is held up during the coding action. Each of these relays releases during the extended off-period of the reset step to restore the field apparatus to its non-coding condition. A line repeater relay LP is provided in the station equipment. This relay is energized during the on-period of the starting step only and closes pickup circuits for various relays which are to operate during the starting step of any code. It is released when all control carrier line relays release at the end of the starting step. The control circuit for this relay is shown and will be discussed more fully hereinafter.

Stated briefly, this remote control system shown is a single station system in which the control functions and indication information are transmitted concurrently. A code to or from any one or a group of functions contains information for all control functions and all indication functions. The system is operated over a two wire line circuit or other communication medium between the office and the interlocking or field station to be controlled. Carrier currents of eight separate and distinct frequencies, four originating at the office (control carriers A, A1, B, and B1) and four originating at the station (indication frequencies C, D, E, and F) are used to transmit the controls and indications. The four control carrier currents are normally off, that is, not applied to the line while the four indication carrier currents are normally on, that is, applied to the line.

Coding operation can be initiated either by the office unit or by the station unit. The office apparatus starts coding action locally while the field initiates coding action at the office by removing one of the indication carrier currents. Each code consists of a starting or synchronizing step, a number of operating steps depending upon the size of the interlocking being controlled, and a reset step. The starting step consists of a period during which all four control carrier currents are on and a period during which all control carrier currents are off. Each operating code step and the reset step consists of a period during which two control frequencies, A or A1 and B or B1, are on and a period during which all control frequencies are off. The off-period of the reset step marks the completion of a code and persists until a new code is initiated. During the first part of this reset step off-period, the equipment is restored or reset to its normal at-rest condition.

Code progression or stepping action is controlled or maintained by the office apparatus. The field counting chain relays are stepped by the on-periods of control carrier currents A or A1 during each step regardless of which of these two carrier currents are applied to the line. In addition, during the on-period of each operating step and the reset step, two two-position, final stick relays at the field location are operated to either of their two positions depending upon which control currents are on. If currents of frequency A and B are on, the corresponding final stick relays are operated to their normal positions, while if carrier currents of frequencies A1 and B1 are on, the corresponding relays are operated to their reverse positions. The control exercised over the corresponding function depends upon the position of the final stick relay. Concurrently, on each of the operating steps and the reset step, four two-position indication relays at the office are operated to either of their two positions depending upon whether the independent indication carrier currents of the frequencies C, D, E, and F are on or off. If the carrier currents are on during a particular step, their respective indication relays will be operated to their normal positions, while if the carrier currents are off during the step, their respective indication relays will be operated to their reverse positions.

With the preceding brief review of the operation of the coded remote control system which is used as the basis for the form of my invention here disclosed, I shall now continue with a description of the apparatus shown in the various parts of FIG. 1.

Each carrier current channel used includes a transmitter for generating the current of the designated frequency and a receiver which includes an amplifier for operating a line relay. For example, the control carrier channel A includes, at the office, a carrier transmitter A generating carrier current of frequency A and, at the station, a receiver A for receiving this carrier current and at times energizing a line relay LA. Similarly, the indication carrier channel C includes, at the station, a carrier current transmitter C for generating current of frequency C and, at the office, a carrier receiver C for receiving current of this frequency and for at times energizing line relay LC. These carrier transmitter and receiver units may be of any well known type which will provide this operation. Since the details of these units are not part of my invention, they are shown conventionally by block diagrams. Each of the block diagrams shown is assumed to include the necessary proper line filters for passing only the corresponding frequencies. Each unit is connected to the line circuit which at the office location comprises the line wires L1 and L2 and at the station, the line wires FL1 and FL2. Each unit also has connections to terminals B1 and N1 of the high voltage source.

Each carrier current transmitter generates and transmits the current of the designated frequency when a third connection to terminal N1 is completed through external contacts. For example, carrier transmitter A generates a current of that frequency when a connection to terminal N1 is completed over back contact *b* of a changeover relay CHA and front contact *b* of transmitter relay OT. Each line relay is energized when carrier current is received by the associated carrier current receiver only if a circuit is completed from terminal B1 through the relay winding and various other external contacts to another connection to the receiver unit. For example, indication line relay LC is energized, when carrier current of frequency C is being received by receiver C, only if the connection is complete from terminal B1 through the winding of relay LC in the direction of the arrow and over back contact *b* of changeover relay CHCP to receiver C.

Each indication carrier current, including that of the spare indication carrier channel 2S, is normally on, that is, is normally transmitted over the line circuit from the station to the office. Carrier transmitter C at the station, for example, is energized, to generate carrier current of this frequency, over two parallel circuits. The first of these may be traced from terminal N1 over normal contact *a* of relay FT, normal contact *a* of relay FY, and back contact *b* of field changeover relay FCHC to transmitter C. A second circuit for energizing transmitter C which is effective during the non-coding or at-rest condition of the equipment may be traced from terminal N1 over back contact *a* of line repeater relay LP, back contacts *a*, in series, of relays LBP and LAP, and back contact *b* of relay FCHC to transmitter C. Similar circuits, except for including back contact *b* of relay FCHD and back contact *b* of relay FCHE, respectively, may be traced for transmitters D and E. Transmitter F has only one energizing circuit active during the at-rest condition. This circuit extends from terminal N1 over normal contact *d* of relay FT, front contact *a* of a start relay ST, normal contact *d* of relay FY, and back contact *b* of relay FCHF to transmitter F. It is to be noted at this point that start relay ST of the station coding unit is normally energized and is deenergized and releases when an indication function is to be transmitted to the office. Front contact *a* of this relay is thus open when an indication code is to be initiated and is reclosed during the first step of such coding action. This contact *a* of relay ST is used to remove carrier current of frequency F from the line to cause the office coding unit to initiate coding action. The spare indication transmitter 2S is also normally energized, the circuit extending from terminal N1 over back contacts *c*, in series, of relays FCHF, FCHE, FCHD, and FCHC to transmitter 2S. During the transmission of codes, the circuits for energizing the indication carrier transmitters during the various code steps are completed to terminal N1 over normal or reverse contacts of relay FY and contacts of the corresponding counting chain relays through contacts of the indication control relays. However, connection is made to terminal N1 during the initial code step directly over contacts of the first counting chain relay F1, these circuits being completed for the various transmitters over front contacts *a, b, c,* and *d* of relay F1, as will be obvious from an inspection of the drawing.

Since each indication receiver at the office, during the at-rest condition of the equipment, is receiving carrier current of the corresponding frequency, each of the indication line relays LC, LD, LE, and LF and spare line relay L2S are normally energized. For example, the circuit for relay LC, as previously traced, extends from terminal B1 through the winding of relay LC in the direction of the arrow and over back contact *b* of relay CHCP to receiver C. Similar circuits may be traced for relays LD, LE, and LF. Relay L2S associated with the spare carrier channel is energized normally from terminal B1 by the circuit extending through the winding of relay L2S, in the direction of the arrow, wire 45, back contacts *d*, in series, of relays CHFP, CHEP, CHDP, and CHCP to receiver 2S. A stick circuit for relay L2S may be traced over front contact *a* of that relay, front contact *b* of a repeater relay L2SP, and wire 46 to receiver 2S. Since relay L2S is normally energized, its repeater relay L2SP is also normally energized through its stick circuit, which includes front contact *b* of relay L2S and front contact *a* and the winding of relay L2SP.

The control carrier currents are normally off, that is, are not transmitted over the line circuit during the non-coding condition except for the spare control carrier current which is normally on. It is to be seen that the control circuits for control carrier transmitters A, A1, B, and B1 are open at front contacts of the office transmitter relay. For example, the control circuit for transmitter A extends from terminal N1 over front contact *b* of relay OT and back contact *b* of office changeover relay CHA to transmitter A. During the non-coding condition, since relay OT is released, this circuit is open at front contact *b* of this relay. The similar circuits for the other transmitters are open at the corresponding front contacts *c, d,* and *e* of relay OT. During the transmission of a code from the office location, these front contacts of relay OT are by-passed by auxiliary control circuits for the transmitters. These auxiliary circuits are not here shown in detail but are closed, through various relay contacts in the coding unit including contacts of the counting chain relays, to transmit the desired control functions by energizing the proper transmitter during each code step. Spare transmitter 1S is normally energized over a simple circuit from terminal N1 including back contact *a* of relay CHP1, one of the changeover hunting relays. Transmitter 1S is also provided with certain auxiliary control circuits established over front contact *a* of relay CHP1, but these circuits will be more fully discussed hereinafter.

With the control carrier currents normally off, the station line relays LA, LA1, LB, and LB1 are normally deenergized, since no carrier current is being received by the corresponding carrier receivers A, A1, B, and B1. However, the circuits for these relays are complete so that they may be immediately energized upon the reception of carrier current by the corresponding carrier receiver. For example, the circuit for relay LA may be traced from terminal B1 through the winding of relay LA in the direction of the arrow and over back contact *b* of the field changeover relay FCHA to receiver A. Similar circuits may be traced for each of the other line relays. Spare line relay L1S is, of course, normally energized since the carrier current from the spare transmitter at the office is normally on the line. A first circuit for energizing this relay may be traced from terminal B1 through the winding of relay L1S in the direction of the arrow and over back contacts *c*, in series, of changeover relays FCHB1, FCHB, FCHA1, and FCHA to receiver 1S. Relay L1S is also energized over a second circuit which includes normal contact *a* of spare line indication relay FL1SK and front contact *a* of relay L1S. Certain other auxiliary circuits are completed at times for energizing spare line relay L1S, but these circuits will be discussed hereinafter during the description of the operation of the apparatus.

As shown in this present application, the carrier currents of the various frequencies are all transmitted over a two wire line circuit. For example, all of the carrier equipment at the office is connected to the line wires L1 and L2. At the station the similar carrier equipment is all connected to the line wires FL1 and FL2. The line circuit in normal use may then be traced from line wire L1 over front contact *a* of office line changeover relay OLCH, normal line wire 1, and front contact *a* of field line changeover relay FLCH to wire FL1 and returning from wire FL2 over front contact *b* of relay FLCH, normal line 2, and front contact *b* of relay OLCH to wire L2. At times the connection is made to stand-by line wires 1 and 2 over back contacts *a* and *b* of relay OLCH from line wires L1 and L2, respectively, and thence over back contacts *a* and *b* of relay FLCH to line wires FL1 and FL2, respectively, at the station. These line changeover relays are normally energized over obvious circuits which include front contacts *a*, respectively, of office normal relay ONOR and field normal relay FNOR.

Relays ONOR and FNOR along with their companion stand-by relays OSB and FSB are normally energized over an auxiliary direct current line circuit superimposed upon the normal and stand-by line wires in addition to the carrier currents which at times flow in these line wires. The auxiliary line circuit for energizing the NOR relays may be traced from the positive terminal of reset battery 13 shown in FIG. 1*d* through the winding of relay ONOR in the direction of the arrow, normal line wire 1, the winding of relay FNOR in the direction of the arrow, normal line wire 2 and back contact *a* of reset relay RS to the negative terminal of battery 13. The similar circuit for the SB relays extends from the positive terminal of battery 13 through the winding of relay OSB in the direction of the arrow, stand-by line wire 1, the winding of relay FSB also in the direction of the arrow, stand-by line wire 2, and back contact *b* of relay RS to the negative terminal of battery 13. It is to be seen, therefore, that the normal and stand-by relays are all normally energized by battery 13. If the normal line is interrupted by any fault so that relay ONOR is deenergized, the release of this relay and the opening of its front contact *a* deenergizes office line changeover relay OLCH. The eventual release of relay OLCH at the end of its slow release period transfers the line connections from the normal line to the stand-by line. The similar action at the station location resulting from the release of relay FNOR and the following release of relay FLCH completes the connection between the office and the station over the stand-by line. Relays OLCH and FLCH are provided with slow release characteristics as is indicated by the downward pointing arrow through the contacts of these relays in order that momentary releases of relays ONOR and FNOR during the reset action, to be discussed shortly, will not cause the transfer of the line connections from the normal to the stand-by line.

The reset action to restore normal operating conditions, after an automatic changeover has occurred to substitute a spare carrier channel for a defective channel, is controlled manually through the normal and stand-by relays just discussed. This manual reset is directly controlled by reset relay RS and its repeater relay RSP. Relay RS is a normally deenergized relay which becomes energized when the changeover reset button CHRSPB is operated to close its contact *a*. As will be discussed hereinafter, push button CHRSPB is operated when the defective carrier channel has been repaired so that it may be returned to use. Repeater relay RSP is normally energized over back contact *c* of relay RS and is provided with slow release characteristics by the half wave rectifier connected in multiple with the relay winding. When relay RS is energized by the closing of contact *a* of push button CHRSPB, it picks up to open back contacts *a* and *b*, thus interrupting the previously traced auxiliary line circuits and deenergizing relays ONOR, OSB, FNOR, and FSB, which then release. Relay RSP is also deenergized by the opening of back contact *c* of relay RS and at the end of its slow release period releases to close its back contacts *a* and *b*. This re-establishes the auxiliary line circuits, by-passing the open back contacts *a* and *b* of relay RS. The normal and stand-by relays at both office and station are reenergized and pick up. The utility of this operation of the NOR and SB relays will be discussed more fully hereinafter during the description of the operation of the changeover system. When the reset action has completed and the push button CHRSPB is released, relay RS is deenergized and releases to close, at its back contacts *a* and B, the two auxiliary line circuits prior to their interruption at back contacts *a* and *b* of relay RSP, which picks up upon being energized by the closing of back contact *c* of relay RS.

The other relays shown in the various parts of FIG. 1 are all normally deenrgized. For example, the office detector relays CHC, CHD, CHE, and CHF are normally deenergized since their energizing circuits through the upper winding are interrupted, respectively, at front contacts *a*, *b*, *c*, and *d* of relay O1. These relays are of the magnetic stick type and in the at-rest condition of the apparatus occupy their normal position. This is assured by the reset circuit for these relays, which extends from terminal B through back contacts *b*, in series, of relays ONOR and OSB, wire 14, and the lower windings, in series, of the detector relays, in the direction of the arrow, to terminal N. In addition, the office indication changeover relays CHCP, CHDP, CHEP, and CHFP are also normally deenergized, their energizing circuits being open, respectively, at reverse contacts *a* of the detector relays CHC, CHD, CHE, and CHF.

The field indication changeover relays FCHC, FCHD, FCHE, and FCHF, shown in FIG. 1*e*, are also normally deenergized. These relays are controlled by code pulses from the office during the changeover process to substitute the spare carrier current channel 2S for a defective indication channel. During codes when no changeover action is in progress, relay FCHC, for example, is held released by a circuit extending from terminal N at front contact *a* of relay LA1 (shown in FIG. 1*f*) over back contact *a* of relay LA, wire 15, back contact *b* of relay LP, reverse contact *e* of relay FY, front contact *e* of relay F1, and the upper winding of relay FCHC to terminal O. It is obvious that the flow of current in this circuit would be in the direction opposite to the arrow in the relay winding and this relay, being of the biased type, thus remains with its contacts released. The pick-up circuit for relay FCHC may be traced from terminal B over back contact *b* of relay LA1, front contact *b* of relay LA, wire 15, back contact *b* of relay LP, reverse contact *e* of relay FY, front contact *e* of relay F1, and the upper winding of relay FCHC to terminal O. In this case the flow of current through the relay winding is in the direction of the arrow and the relay is properly energized and picks up. This action of these relays will be more fully discussed hereinafter.

The office control carrier changeover relays CHA, CHA1, CHB, and CHB1 (shown in FIG. 1*c*) are normally deenergized also. These relays pick up in sequence during the hunting action controlled by the changeover hunting relays CHP, CHP1, CHPP, and CHPP1, also shown in FIG. 1*c*. This hunting action occurs during the changeover action for substituting the spare control carrier channel 1S for a defective control carrier channel and the entire action will be fully described during the description of the changeover operation. The corresponding field control carrier changeover relays FCHA, FCHA1, FCHB, and FCHB1 are likewise deenergized normally. These relays are controlled during the control carrier changeover process by the control changeover initiating relay FCH, which in turn is controlled by the line relays LA, LA1, LB, and LB1.

Other relays shown in the various parts of FIG. 1 will be discussed as the changeover operation is described. It is believed that the system can be best understood by describing the operation during the various changeover actions to substitute either the spare indication carrier channel 2S or the spare control carrier channel 1S for a defective channel. Accordingly, a description of the changeover operation follows.

*System operation*

Assuming that a non-coding or at-rest condition of the apparatus prevails, it will be remembered that all indication and spare carrier transmitters are at this time energized so that the corresponding carrier currents are on the line. It follows, then, that all of the indication line relays at the office are picked up. At the office, the code check relay CK is also held energized by its stick circuit. This circuit may be traced from terminal B over front contact *a* of relay LF, front contact *a* of relay LE, front contact *a* of relay LD, front contact *a* of relay LC, wire 16, and front contact *a* and the winding of relay CK to terminal N. It is to be noted that, once released, relay CK remains released during a code and is energized from terminal B through circuits in the coding unit completed during the final code step (shown conventionally by a dotted line in FIG. 1*b*), front contact *a* of relay TP, and the winding of relay CK to terminal N.

I shall now assume that one of the indication carrier channels fails and shall take as a specific example channel C. This failure may be anywhere in the channel, that is, the failure may be in the transmitter at the station, in the receiver at the office, or in some specific connection to this transmitter or receiver. The exact location and cause of the failure of the channel is immaterial to this present discussion. With carrier current no longer received by receiver C in the office, relay LC is deenergized and releases. The opening of front contact *a* of relay LC interrupts the stick circuit for relay CK and this relay releases to energize the office transmitter relay OT. The energizing circuit for relay OT in this case may be traced from terminal B at back contact *d* of relay RS (shown in FIG. 1*d*) over wire 17, normal contact *a* of relay CF, back contact *a* of relay OX, back contact *b* of relay CK, back contact *b* of relay TP, wire 18, back contact *b* of relay LC, front contact *b* of relay LD, wire 19, back contact *a* of relay TPP, and the winding of relay OT to terminal N. When relay OT picks up, the closing of its front contact *a* completes a stick circuit which by-passes the pickup circuit just traced from wire 17 to back contact *a* of relay TPP. It is to be noted that if another indication channel had failed rather than channel C, front contact *b* of relay LC would by-pass the contacts of the other line relays in this energizing circuit for relay OT. When relay OT picks up, it also initiates a coding action and as will appear shortly, three codes follow each other in succession to accomplish the changeover action.

During the first step of the initial code, the office detector relay corresponding to the defective carrier channel is operated to its reverse position. The circuit for this is established when relay OY operates to its reverse position, relay OZ operates to its normal position, and relay O1 picks up. The actual circuit may be traced from terminal O through the upper winding of relay CHC in the direction opposite to the arrow, front contact *a* of relay O1, reverse contact *a* of relay OY, normal contact *a* of relay OZ, back contact *c* of relay LC, wire 20, and back contact *c* of relay CK to terminal N. Similar circuits may be traced for the other detector relays CHD, CHE, and CHF over other contacts of relay OY, OZ, and O1 and the corresponding contacts of relays LD, LE, and LF, respectively. At this time, with front contacts *c* of relays LD, LE, and LF closed, current flows from terminal B at back contact *d* of relay CK over wire 29 and through the upper windings of relays CHD, CHE, and CHF to hold these relays in the normal position. Since relay CHC is of the magnetic stick type, it holds in its reverse position even though the previously traced circuit is interrupted at the end of the first code step. This first code of the changeover action then completes in a normal manner except that the indication registry circuits for the relays controlled over indication carrier channel C are open at normal contacts *b* and *c* of relay CHC.

On the reset or final step of this first code, relay OX releases and its back contact *b* closes to prepare a circuit for energizing the proper office indication changeover relay, in the present example, relay CHCP. This energizing circuit extends from terminal B at back contact *b* of relay OX over front contact *c* of relay L2SP, front contact *c* of relay L2S, wire 21, normal contacts *d*, in multiple, of relays CHD, CHE, and CHF, reverse contact *a* of relay CHC, wire 22, and the winding of relay CHCP to terminal N. The energizing circuits for the other office indication changeover relays CHDP, CHEP, and CHFP are similar and include, respectively, reverse contacts *a* of relays CHD, CHE, and CHF with wires 23, 24, and 25. When relay CHCP closes its front contact *a*, it completes a stick circuit for itself including wire 26 and a multiple connection from terminal B over front contacts *c* of relays ONOR and OSB. The opening of back contact *b* of relay CHCP disconnects relay LC from receiver C and the closing of front contacts *c* and *d* of relay CHCP prepares a circuit which closes shortly to connect line relay LC to spare receiver 2S. Closing of front contact *b* of relay CHCP prepares a circuit, also closed shortly, for connecting relay L2S to the receiver of the defective carrier channel C. The closing of front contact *e* of relay CHCP prepares a circuit for transmitting a control to activate the proper changeover relay at the station location.

The second code of the changeover action follows immediately. This code is initiated again by the release of relay CK. As was previously described, relay CK is energized and picks up during the reset or final step of the initial code. However, its stick circuit is still open at front contact *a* of relay LC, and relay CK again releases to initiate further coding action. Relay OT picks up again as before and the second code begins.

During the first or second step of the second code, depending upon which indication channel is defective, a control code character is transmitted over the control channels to operate the proper one of the field indication changeover relays FCHC, FCHD, FCHE, and FCHF to prepare circuits for the later substitution of the stand-by transmitter for the transmitter of the defective indication channel. In the present example, this code character is transmitted on the first code step on control carrier channel A. The circuit for controlling transmitter A is shown partially in FIG. 1*b* and includes front contact *e* of relay O1, front contact *e* of relay CHCP, and bus wire TA. The remainder of the circuit is completed through control circuits established in the office coding unit which are not a detailed part of my invention and which for simplicity are omitted from the drawings. Similar circuits would be completed over front contacts *e* of relays CHDP, CHEP, and CHFP to energize the proper field indication changeover relay in case the indication channel corresponding to one of these other relays was defective. It will be noted that the circuit for the control character for channels E and F also includes front contacts *a* and *b*, respectively, of relay O2, rather than front contacts of relay O1, since the character for these two channels is transmitted on the second code step.

At the station, the reception of this control character in the present example causes relay FCHC to be energized. The circuit for this relay may be traced from terminal B at back contact *b* of relay LA1 over front contact *b* of relay LA, wire 15, back contact *b* of relay LP, reverse contact *e* of relay FY, front contact *e* of relay F1, and the upper winding of relay FCHC to terminal O. Relay FCHC picks up and closes its front contact *a* to complete a stick circuit which includes front contacts *b*, in multiple, of relays FNOR and FSB and wire 28. Relay FCHC, upon picking up, prepares circuits for the eventual substitution of transmitter 2S in place of transmitter C. It is to be noted at this time that a similar circuit for relay FCHE would include normal contact *e* of relay FY and front contact *a* of relay F2 as well as contacts *b* of relays LA, LA1, and LP. Similar circuits may also be traced for relays FCHD and FCHF, which include contacts *b* of relays LB and LB1, wire 29, back contact *c* of relay LP, and, for relay FCHD, reverse contact *f* of relay FY and front contact *f* of relay F1 or, for relay FCHF, normal contact *f* of relay FY and front contact *b* of relay F2.

Relay FCHC, upon picking up, also interrupts, at its back contact *c*, the keying circuit, that is, the connection to terminal N1, for transmitter 2S, so that carrier current of frequency 2S is removed from the line circuit. The removal of carrier current 2S from the line deenergizes relay L2S at the office, since current is no longer received by receiver 2S. Relay L2S, upon release, opens its front contact *b* to deenergize its repeater relay L2SP, which shortly releases. The release of relay L2SP completes the substitution circuits for connecting line relay LC to receiver 2S. The circuit for energizing relay LC may now be traced from terminal B1 through the winding of relay LC, in the direction of the arrow, front contact *d* of relay CHCP, back contact *d* of relay L2SP, and front contact *c* of relay CHCP to receiver 2S. At the same time, relay L2S is connected to receiver C of the defective channel, this circuit extending from terminal B1 through the winding of relays L2S, wire 45, back contact *e* of relayL2SP, and front contact *b* of relay CHCP to receiver C. This completes the changeover action at the office, but the transmitter 2S at the field station is still deenergized and further action is necessary to complete the entire changeover.

The release of relay L2S also causes the transmission of a control code character during the second coding action to energize the corresponding indication relay L2SK at the station. This code character may be sent during any one of the following steps of the second code as the code progression continues. For purposes of this explanation, I have chosen code step 3 for transmitting this code character, although it is to be understood that any other following step may be chosen. The circuit for controlling this character, as partially shown in FIG. 1*b*, includes front contact *a* of relay O3, back contact *d* of relay L2S, and bus wire TA1. At the station, the circuit for energizing relay L2SK extends from terminal N at front contact *a* of relay LA1 over back contact *a* of relay LA, wire 15, back contact *b* of relay LP, reverse contact *e* of relay FY, front contact *a* of relay F3, and the winding of relay L2SK to terminal O. The flow of current in this circuit is of a direction through the relay winding as to cause the relay to operate its contacts to their reverse position. The closing of reverse contact *a* of relay L2SK completes a circuit including front contact *e* of relay FCHC for energizing repeater relay L2SKP, which picks up to close its front contact *a* and complete a stick circuit by-passing reverse contact *a* of relay L2SK.

The pickup of relay L2SKP completes the substitution action by substituting transmitter 2S for transmitter C. In other words, the keying circuit for transmitter 2S may now be traced from transmitter 2S over front contact *c* of relay FCHC, front contact *b* of relay L2SKP, front contact *d* of relay FCHC, and thence over normal contacts *a*, in series, of relays FY and FT to terminal N1, or over back contacts *a*, in series, of relays LBP, LAP, and LP to terminal N1. Transmitter 2S is thus now controlled by the keying circuit normally controlling transmitter C. At the same time, the closing of front contact *c* of relay L2SKP completes a circuit including front contact *b* of relay FCHC to permanently key transmitter C, so that the carrier current of frequency C will be immediately transmitted to the office when the defective channel is repaired.

The changeover action is now complete with spare channel 2S substituted for the defective channel, which was here assumed to be channel C. The second code progresses to completion and a third code follows immediately. On the first step of this third code, relay CHC at the office is operated again to its normal position. This circuit may be traced from terminal B at back contact *d* of relay CK, which is closed at this time, over wire 29, front contact *c* of relay LC, which is now picked up, normal contact *a* of relay OZ, reverse contact *a* of relay OY, front contact *a* of relay O1 and the upper winding of relay CHC to terminal O. The flow of current in this circuit through the relay winding is of such direction as to cause the relay to operate to its normal position. Normal contacts *b* and *c* of relay CHC are now closed so that the indication registry circuits for this channel are complete and those indications which were unable to be recorded during the first and second code of the changeover coding action are properly recorded during this third code. It is to be noted that the indications of the other three channels D, E, and F were properly recorded during each of the codes previously described. Further, during the coding action for the changeover, all controls will be transmitted in the normal manner if no failure of a control channel has also occurred.

Various audible and visible indicators may be provided at the office to notify the operator of the system that a carrier channel is defective and that a substitution or changeover action has been completed. These circuits are not shown, in order to simplify the drawings, since the use of such indications is well known and any desired type of circuit arrangement may be used. If a second indication channel should now fail, no substitution will be possible since only one spare indication channel is provided. A continuous coding action would be initiated, which would continue until one of the defective channels was repaired. The indication registry circuits for the second channel which failed would remain open at normal contacts *b* and *c* of the corresponding office detector relay and indications normally carried by this channel would not be recorded during this period.

I shall now describe the reset action which is required of the operator in order to return indication channel C to service when it is repaired. After an indication is received that the defective indication channel has been repaired and is now ready for service, the operator pushes reset push button CHRSPB, which causes relay RS to pick up. This deenergizes repeater relay RSP, which releases at the end of its slow release period. As previously described, this action causes relays ONOR, OSB, FNOR, and FSB to momentarily release and then pick up again. The opening of front contacts *b* of relays FNOR and FSB interrupts the stick circuit for relay FCHC and this relay, being of the biased type, immediately releases opening its front contacts. The opening of front contact *e* of relay FCHC deenergizes relay L2SKP, which also immediately releases. The release of these two relays returns the station circuit arrangement to its initial condition so that transmitter C is controlled by its usual keying circuit and transmitter 2S is permanently keyed over the circuit previously traced.

The opening of front contacts *c* of relays ONOR and OSB interrupts the stick circuit for relay CHCP at the office and this relay immediately releases. A circuit is also established, for reenergizing relay L2SP, which extends from terminal B at back contact *c* of relay ONOR over back contact *a* of relay OSB, wire 30, and the winding of relay L2SP to terminal N. Since relay L2S is also energized at this time, first by receiver C and then by receiver 2S, the stick circuit previously traced for relay L2SP is completed upon the closing of its front contact *a*. Relay L2SP thus remains energized when relays ONOR and OSB pick up again shortly thereafter. The release of relay CHCP and the pickup of relay L2SP return the office circuit arrangement to its normal condition, reconnecting line relay LC to receiver C, so that it may be controlled in the usual manner. Relay L2S is likewise reconnected to spare receiver 2S and as spare indication transmitter 2S at the station was previously energized, carrier current is received by receiver 2S to energize relay L2S. In addition, the closing of back contacts *b* of relays ONOR and OSB energizes the lower windings of all of the detector relays at the office, the energizing circuit also including wire 14. The current flow in this circuit is in such direction as to assure that all of the detector relays are occupying their normal position at the end of the reset action.

I shall now return to the initial at-rest or non-coding condition of the apparatus and assume that a control carrier channel fails. It is further assumed for purposes of this description that the defective control channel is the carrier channel A1. However, since the control carrier currents are normally off, that is, are not transmitted over the line during the at-rest condition, no detection of this failure of a control channel is possible until a code is initiated. It is to be noted, however, that the spare channel 1S is active, continuously transmitting current of that frequency over the line to the station. This results in the spare control line relay L1S at the station being energized so that its contacts are picked up.

When a code is initiated at the office, all four control carrier currents are applied to the line, since the control carrier transmitters are activated over front contacts of relay OT, which picks up when the code is initiated. For example, the circuit for transmitter A1 may be traced from terminal N1 over front contact *c* of relay OT and back contact *b* of relay CHA1 to the transmitter A1. Similar circuits for the other transmitters are completed over front contacts *b*, *d*, and *e* of relay OT. As was previously described, coding action at the office cannot continue beyond the pickup of relay TP unless a proper answer-back is received from the station. At the office, the proper answer-back is indicated by the release of the indication line relays LC, LD, LE, and LF, this release of these relays being due to the removal of the four indication carriers from the line circuit. With all of the control carrier channels in working order, the reception of the four control carrier currents at the station energizes the control line relays LA, LA1, LB, and LB1. The pickup of these relays energizes the station transmitter relay FT. The circuit for this extends from terminal B over front contacts *c*, in series, of relays LB1, LB, LA1, and LA, wire 31, back contact *a* of relay FX, and the lower winding of relay FT to terminal N. It is obvious that the flow of current through the lower winding of relay FT is in the direction to cause the relay to operate to its reverse position, opening all of its normal contacts. This opens one of the keying circuits for each of the indication carrier transmitters at normal contacts *a*, *b*, *c*, and *d* of relay FT. In addition, as soon as relay FT is reversed, line repeater relay LP is energized, the circuit for this also including front contacts *c* of the control line relays and wire 31 and thence over reverse contact *e* of relay FT and the winding of relay LP to terminal N. The opening of back contact *a* of LP interrupts the other keying circuit for the indication carrier transmitters and thus all of the indication carrier currents are removed from the line circuit.

When all four indication carrier currents are removed from the line circuit so that the indication line relays at the office all release, relay TPP may then be energized to allow the coding action to progress at the office. However, in the present example with control channel A1 defective, as was assumed for purposes of the description, no answer-back is received from the station. It is obvious that with relay LA1 remaining released due to receiver A1 receiving no carrier current from the office, the energizing circuits for relays FT and LP are not completed at this time. Since these relays do not, respectively, operate reverse and pick up, the indication carrier currents are not removed from the line circuit and the coding action at the office is halted. The coding action remains halted until the spare control carrier channel 1S is substituted for the defective channel.

When the three control carrier currents are received at the station under the assumed conditions, a circuit is completed for energizing the changeover initiating relay FCH. This circuit may be traced from terminal B over front contacts *d*, in multiple, of relays LA, LB, and LB1, wire 32, back contacts *d*, in series, of relays LBP and LAP, which are still released at this time since relay FX has not yet picked up, wire 33, front contact *b* of relay L1S, back contacts *e*, in series, of the field changeover relays FCHB1, FCHB, FCHA1, and FCHA, normal contact *b* of relay FL1SK, and the winding of relay FCH to terminal N. The flow of current is in such direction that relay FCH picks up.

When relay FCH picks up, the closing of its front contacts *a*, *b*, *c*, and *d* completes a circuit for the field changeover relay corresponding to the defective channel. In the present example, this circuit may be traced from terminal B at front contact *c* of relay L1S over normal contact *c* of relay FL1SK, front contact *e* of relay LA, back contact *e* of relay LA1, front contact *c* of relay FCH, and the winding of relay FCHA[1] to terminal N. When relay FCHA1, thus energized, picks up, the closing of its front contact *a* completes a stick circuit which includes wire 34 and front contacts *c*, in multiple, of relays FSB and FSNOR shown in FIG. 1*d*. It is obvious that this stick circuit remains effective until a manual reset action is initiated by the operator, as was previously described in connection with the indication changeover. The opening of back contact *e* of relay FCHA1 interrupts the circuit for relay FCH and this relay releases. When relay FCHA1 picks up, it also prepares circuits over contacts *b*, *c*, and *d* for the later substitution of receiver 1S for the receiver A1 of the defective channel. It is to be noted that although back contact *c* of relay FCHA1 is open, relay L1S is held energized over its stick circuit, which includes its own front contact *a* and normal contact *a* of relay FL1SK.

At the office, when relay TP picks up, it initiates a control changeover hunting action, which continues until the spare transmitter 1S is substituted for the transmitter of the defective channel. During this hunting action, the changeover relays CHA, CHA1, CHB, and CHB1 are picked up in sequence until the defective channel is located. In other words, these relays are energized and picked up in the order named with the hunting action ceasing as soon as the defective channel is located, that is, as soon as the changeover relay corresponding to the defective channel is energized. In the present case then, the changeover hunting action ceases when relay CHA1 is energized and picks up.

When relay TP picks up, it completes a circuit for energizing the first changeover hunting relay CHP. This circuit extends from terminal B at back contact *b* of relay TPP (shown in FIG. 1*b*) over front contact *c* of relay TP, wire 35, front contacts *d*, in multiple, of office line relays LC, LD, LE, and LF, wire 36, normal contacts *a*, in series, of relays L1SK1 and L1SK, back contact *b* of relay CHP1, back contact b of relay CHPP and the winding of relay CHP to terminal N. Relay CHP picks up and completes at its front contact *a* an obvious circuit for energizing relay CHPP1. The closing of front contact *a* of relay CHPP1 completes a circuit extending from terminal B at back contact c of relay TPP over wire 37, back contact *c* of relay CHP1, front contact *a* of relay CHPP1, and the winding of relay CHPP to terminal N. When relay CHPP picks up, it closes its front contact *a* to complete a stick circuit by-passing front contact *a* of relay CHPP1 in the circuit just described. The opening of back contact *b* of relay CHPP interrupts the circuit for relay CHP and this latter relay, which is made slightly slow release by the half wave rectifier connected in multiple with the relay winding, releases at the end of this slow release period. Although the opening of front contact *a* of relay CHP interrupts the energizing circuit initially traced for relay CHPP1, this latter relay is now held energized by an obvious circuit completed at front contact *c* of relay CHPP, this circuit being completed prior to the release of relay CHP.

The release of relay CHP completes a circuit for energizing changeover relay CHA, which is the first of these relays to be energized in the hunting action. This circuit includes back contact *b* of relay TPP (shown in FIG. 1*b*), front contact *c* of relay TP, wire 35 front contacts *d*, in multiple, of line relays LC, LD, LE, and LF, wire 36, normal contacts *a* of relays L1SK and L1SK1, back contact *b* of relay CHP, front contact *d* of relay CHPP, and the winding of relay CHA. When relay CHA picks up, it closes its front contact *a* to complete an initial stick circuit for itself which also includes back contacts *a* of the other changeover relays CHA1, CHB, and CHB1, wire 38, and front contacts *d*, in multiple, of relays ONOR and OSB. It is to be noted at this point that, if a normal progression of the code is obtained, that is, the proper answer-back is received from the station so that relay TPP picks up and allows the code to progress, the release time of relay CHP, when added to the pickup time of this relay plus the pickup time of relays CHPP1 and CHPP, is such that back contact *b* of relay CHP will not close prior to the opening of back contact *b* of relay TPP so that the energizing circuit for relay CHA is not completed and none of the changeover relays is energized. Under these normal circumstances, relays CHPP and CHPP1 release in that order following the pickup of relay TPP.

When relay CHA picks up, the opening of its back contact *b* unkeys carrier transmitter A since the circuit over front contact *b* is open at reverse contact *b* of relay L1SK1. The removal of control carrier current of frequency A from the line circuit deenergizes receiver A and also, as a result, deenergizes indication line relay LA at the station. This latter relay releases. The closing of front contact *c* of relay CHA completes an obvious circuit for energizing relay CHP1, which then picks up. Relay CHA also prepares a circuit at its front contact *d* for the eventual substitution of transmitter 1S for transmitter A in the changeover hunting action, the actual substitution occurring shortly as will be described.

When back contact *a* of relay CHP1 opens, the spare control carrier transmitter 1S is unkeyed, since the auxiliary circuit over front contact *a* of relay CHP1 is interrupted at back contact *e* of relay CHPP, this contact being still open at this moment as will be explained later. With carrier current of frequency 1S removed from the line circuit, spare line relay L1S at the station is deenergized since current is no longer received by receiver 1S. This line relay then releases and the closing of its back contact *b* causes the energization of relay FL1SK in the reverse direction. This circuit may be traced from terminal B at front contacts *d*, in multiple, of relays LB and LB1, which are still picked up at this time, wire 32, back contacts *d*, in series, of relays LBP and LAP, wire 33, back contact *b* of relay L1S, back contact *e* of relay FCH, and the upper winding of relay FL1SK to terminal O. It is obvious that the flow of current in this upper winding is in the direction opposite to the arrow so that relay FL1SK operates its contacts to their reverse position. When relay FL1SK operates reverse, it completes a circuit for connecting line relay LA1 to spare receiver 1S. This circuit extends from terminal B1 through the winding of relay LA1, front contact *d* of relay FCHA1, back contact *d* of relay FCHA, reverse contact *d* of relay FL1SK, front contact *c* of relay FCHA1, and back contact *c* of relay FCHA to receiver 1S. Similarly, a circuit is completed from terminal B1 through the winding of relay L1S over reverse contact *a* of relay FL1SK and front contact *b* of relay FCHA1 to receiver A1, whereby line relay L1S is made responsive to receiver A1. At this time, of course, both relays LA1 and L1S remain released since carrier currents of the frequencies A1 and 1S are not being received at the station.

When relay CHP1 at the office picks up, it also interrupts, at its back contact *c*, the stick circuit for relay CHPP. This latter relay releases at the end of a slow release period which is established by the resistor, capacitor combination connected in multiple with the relay winding. Since relay CHA is still up at this time, the release of relay CHPP to close its back contact *e* completes a circuit for keying the spare transmitter 1S over the keying circuit usually connected to transmitter A. In other words, a circuit may be traced from terminal N1 over front contact *b* of relay OT, front contact *d* of relay CHA, back contact *e* of relay CHPP, and front contact *a* of relay CHP1 to transmitter 1S. Carrier current of the frequency 1S is thus reapplied to the line circuit and, at the station, since relay LA1 is now connected to receiver 1S, this latter relay is energized upon the receipt of the carrier current and picks up. However, only three of the line relays at the station are now picked up, that is, relays LA1, LB, and LB1, relay LA remaining released since carrier current of frequency A is not being transmitted from the office at this time. A proper answer-back thus is not received at the office from the station and the changeover hunting action continues.

When relay CHPP at the office releases, the opening of its front contact *c* interrupts the circuit for relay CHPP1 and this latter relay releases at the end of a slow release period established by another resistor, capacitor combination connected in multiple with its winding. It is to be noted at this time that the opening of front contact *d* of relay CHPP interrupts the energizing circuit for relay CHA but this relay is still maintained energized over its initial stick circuit, which includes back contacts *a* of the other office changeover relays. The release of relay CHPP1 completes a circuit for energizing the second office changeover relay CHA1. This latter circuit extends from terminal B at back contact *b* of relay TPP over front contact *c* of relay TP, wire 35, front contacts *d*, in multiple, of line relays LC, LD, LE, and LF, wire 36, normal contacts *a* of relays L1SK1 and L1SK, back contact *b* of relay CHP, back contact *d* of relay CHPP, back contact *b* of relay CHPP1, front contact *e* of relay CHA, and the winding of relay CHA1 to terminal N.

Relay CHA1, thus energized, picks up and completes a stick circuit for itself which includes its own front contact *a* and back contacts *a* of relays CHB and CHB1, wire 38, and front contacts *d* of relays OSB and ONOR. The opening of back contact *a* of relay CHA1 interrupts the initial stick circuit for relay CHA. However, when relay CHPP1 released, it completed a second stick circuit for relay CHA, which includes front contact *f* of relay CHA, back contact *c* of relay CHPP1, and the previously mentioned wire 38 and front contacts *d* of relays ONOR and OSB. The opening of back contact *b* of relay CHA1 interrupts the keying circuit for transmitter A1. Also, the closing of front contact *g* of relay CHA1, with relay CHA still picked up, completes another circuit for energizing relay CHP. This circuit extends from terminal B at front contact *g* of relay CHA1 over front contact *g* of relay CHA, front contact *b* of relay CHP1, back contact *b* of relay CHPP, and the winding of relay CHP to terminal N. Thus energized, relay CHP picks up.

The closing of front contact *a* of relay CHP again energizes relay CHPP1 over the obvious circuit previously discussed. When relay CHPP1 picks up, the opening of its back contact *c* interrupts the second stick circuit for relay CHA and this latter relay immediately releases. The opening of front contact *g* of relay CHA deenergizes relay CHP but this latter relay holds its front contacts closed for a slow release period established by the half wave rectifier, previously discussed, connected in multiple with the relay winding. The opening of front contact *d* of relay CHA and the closing of the corresponding back contact transfers the spare transmitter 1S from the keying circuit for transmitter A to the keying circuit for transmitter A1. This latter circuit may be traced from terminal N1 over front contact *c* of relay OT, front contact *d* of relay CHA1, back contact *d* of relay CHA, back contact *e* of relay CHPP, and front contact *a* of relay CHP1 to transmitter 1S. At the same time, the closing of back contact *b* of relay CHA restores transmitter A to its usual keying circuit over front contact *b* of relay OT. The transfer of the keying circuit for transmitter 1S at contact *d* of relay CHA results in such a short open circuit period that relay LA1 at the station, which is now connected to receiver 1S, does not release. At about the same time, due to the closing of the keying circuit for transmitter A and the reapplying of carrier current of frequency A to the line circuit, line relay LA at the station is reenergized and picks up.

All four line relays at the station are now energized and picked up, relays LA, LB, and LB1 being energized in the usual manner by the corresponding receivers, which are activated by carrier currents of the corresponding frequencies received from the office. Line relay LA1 is connected to spare receiver 1S and since carrier current of the frequency 1S is being transmitted from the office, this line relay is also energized. With all four line relays picked up, circuits, previously traced, are completed for operating relay FT to its reverse position and for energizing relay LP so that it picks up. This interrupts the keying circuits for the indication carrier transmitters as was previously explained and the currents of these frequencies are removed from the line circuit. This provides a proper answer-back indication at the office with all line relays at that location releasing. Relay TPP is now energized and picks up to allow the coding action to progress. The coding continues then with spare channel 1S being substituted for defective channel A1.

When line relays LC, LD, LE, and LF release and relay TPP picks up, the circuit previously traced for energizing the changeover relays is interrupted at front contacts *d* of the line relays and back contact *b* of relay TPP. However, relay CHA1 is held energized over its previously traced stick circuit, which includes back contacts *a* of relays CHB and CHB1, wire 38, and front contacts *d*, in multiple, of relays OSB and ONOR. Relay CHA1 is thus held energized until a manual reset action is completed. When relay TPP picks up to close its front contact *c*, a circuit is completed for energizing relay L1SK1 in the reverse direction. Before describing this circuit, it should be noted that at this time relay CHP1 is held energized over front contact *c* of relay CHA1 and relay CHPP1 is still energized over front contact *a* of relay CHP, the latter relay, although deenergized, having a sufficient slow release period to maintain its front contacts closed until relay TPP picks up. The circuit for relay L1SK1 is then traced from terminal B over front contact *c* of relay TPP, wire 39, front contact *f* of relay CHPP1, front contact *d* of relay CHP1, and the lower winding of relay L1SK1, in the direction opposite to the arrow, to terminal O. Relay L1SK1 thus operates its contacts to their reverse position. The opening of normal contact *a* of relay L1SK1 further opens the energizing circuit for the changeover relays and maintains this circuit open until a manual reset action is accomplished. The closing of reverse contact *b* of relay L1SK1 completes a circuit, which also includes front contact *b* of relay CHA1, for permanently keying the transmitter of the defective channel so that an indication may be obtained upon repair of this channel.

As was previously described in connection with the changeover of the indication channels, once the spare control channel is substituted for a defective carrier channel, this substitution is maintained until a manual reset action is initiated by the operator at the office. This manual reset will be initiated only when an indication is received that the defective channel has been repaired. As was previously described, this reset action is initiated by the operation of changeover reset push button CHRSPB. This action results in the momentary releasing of relays ONOR and OSB at the office and the corresponding relays FNOR and FSB at the station. At the office, the opening of front contacts *d* of relays ONOR and OSB interrupts the stick circuit for the changeover relays, in the present example relay CHA1 which releases. The closing of back contact *d* of relay ONOR and back contact *e* of relay OSB completes a circuit from terminal B over these back contacts in series, wire 40, the upper winding of relay L1SK1 and the lower winding of relay L1SK to terminal N. The flow of current through the relay windings is in such direction as to cause these relays to operate to their normal position. With relay CHA1 released and relay L1SK1 in its normal position, the circuits at the office are returned to their normal condition so that transmitters A, A1, B, and B1 are keyed by their usual circuits which are normally open at front contacts of relay OT. Spare transmiter 1S is keyed continuously over back contact *a* of relay CHP1.

At the station, the opening of front contacts *c* of relays FSB and FNOR interrupts the stick circuit for relay FCHA1 and this relay immediately releases. The closing of back contacts *d* of relays FSB and FNOR completes a circuit from terminal B over these back contacts in series, wire 41, and the lower winding of relay FL1SK to terminal N. The flow of current is in the direction of the arrow through the lower winding so that relay FL1SK operates its contacts to their normal position. The release of relay FCHA1 and the return of relay FL1SK to its normal position restores the circuits at the station to their usual condition so that line relays LA, LA1, LB, LB1, and L1S are again connected to the corresponding carrier receivers.

It is obvious that in a similar manner and over similar circuits, the stand-by control channel can be substituted automatically for any one of the four control channels which may become defective. It may also be seen that if an automatic changeover to the stand-by control channel has occurred and then an indication carrier channel becomes defective before the defective control channel has been repaired, an automatic changeover to the stand-by indication channel will be obtained as described previously just as if no previous changeover action had taken place. Likewise, if an automatic changeover to the stand-by indication channel has occurred and then a control channel fails, an automatic changeover into the stand-by control channel will be obtained as described above just as if no previous changeover action had occurred.

The system of my invention thus provides, in a remote control system using carrier channels for transmission of the controls and indications between the office and station, for the automatic changeover from a defective channel in either direction to a stand-by channel provided for that direction of transmission. This changeover action, in the event of an indication channel failure, occurs immediately without any action required on the part of the system operator and results in the substitution of the stand-by channel for the defective channel so that operation of the system may continue. In the event a control channel becomes defective, the substitution action is initiated immediately upon the start of a coding action initiated either by the system operator or by the field station. The entire changeover system thus assures that controls may be delivered to the station for the proper functioning of the field apparatus and that indications of the position and condition of the interlocking equipment in the field may be received at the office at all times. This all is accomplished without losing the efficiency and economy which is inherent to the carrier operated remote control system.

Although I have herein shown and described but one form of automatic changeover for carrier circuits as applied to one type of remote control system, it is to be understood that various changes and modifications may be made therein within the scope of the appended claims without departing from the spirit and scope of my invention.

Having thus described my invention, what I claim is:

1. In combination with a carrier remote control system including an office and a station, said system being capable of transmitting controls from said office to said station and indications in the opposite direction, said controls being transmitted over a first plurality of carrier channels, said indications being transmitted over a second plurality of carrier channels, each plurality including a single spare carrier channel, said control channels being normally inactive and becoming active to initiate any transmission, continued transmission being dependent upon the reception of an answer-back indication over the indication channels from said station, said answer-back indication being transmitted to said office only if all of said control channels become active simultaneously at said station; changeover apparatus to automatically substitute the single spare control channel for any one inoperative control channel, said changeover apparatus including a plurality of changeover relays at said office, one such relay being associated with each control channel except said spare channel, each said changeover relay being effective when energized to substitute at the office the spare control channel for the associated control channel, said changeover means also including a hunting relay means and an energizing circuit means therefor, said hunting relay means being effective when energized to sequentially energize said changeover relays until said spare control channel is substituted for an inoperative control channel, said energizing circuit means being effective to energize said hunting relay means when no answer-back indication is received from said station upon the initiation of any control transmission.

2. In combination with a coded carrier remote control system including an office and a station, said system being capable of transmitting control codes from said office to said station and indication codes from said office to said station and indication codes in the opposite direction, said control codes being transmitted over a first plurality of carrier channels, said indication codes being transmitted over a second plurality of carrier channels, each plurality including a single spare carrier channel, said control channels being normally inactive and becoming active to initiate coding action, continued coding action being dependent upon the reception of an answer-back indication over the indication channels from said station, said answer-back indication being transmitted to said office only if all of said control channels become active simultaneously at said station; changeover apparatus to automatically substitute the single spare control channel for any one inoperative control channel, said changeover apparatus including a plurality of changeover relays at said office, one such relay being associated with each control channel except said spare channel, each said changeover relay being effective when energized to substitute at the office the spare control channel for the associated control carrier channel, said changeover means also including a hunting relay means and energizing circuits therefor, said hunting relay means being effective when energized to sequentially energize said changeover relays until said spare control channel is substituted for an inoperative control channel, said energizing circuits including a first contact normally open and becoming closed when coding action is initiated and a second contact normally closed and becoming open when an answer-back indication is received from said station.

3. In combination with a carrier remote control system including an office and a station, said system being capable of transmitting controls from said office to said station and indications in the opposite direction, said controls being transmitted over a first plurality of carrier channels, said indications being transmitted over a second plurality of carrier channels, each plurality including a single spare carrier channel, said control channels being normally inactive and becoming active to initiate any transmission, continued transmission being dependent upon the reception of an answer-back indication over the indication channels from said station, said answer-back indication being transmitted to said office only if all of said control channels become active simultaneously at said station; changeover apparatus to automatically substitute the single spare control channel for any one inoperative control channel, said changeover apparatus including an office changeover relay and a station changeover relay for each control channel except said spare control channel, a hunting relay means at said office and an energizing circuit therefor, and an energizing means for said station changeover relays, each said changeover relay being effective when energized to substitute said spare control channel at that location for the control channel associated with that relay, said hunting relay means being effective when energized to sequentially energize said office changeover relays until said spare control channel is substituted for an inoperative control channel, said energizing circuit being effective to energize said hunting relay means when no answer-back indication is received from said station upon the initiation of any control transmission, said energizing means at said station being effective to energize the station changeover relay associated with an inoperative control channel when all said control channels do not become simultaneously active upon initiation of a control transmission.

4. In combination with a coded carrier remote control system including an office and a station, said system being capable of transmitting control codes from said office to said station and indication codes in the opposite direction, said control codes being transmitted over a first plurality of carrier channels, said indication codes being transmitted over a second plurality of carrier channels, each plurality including a single spare carrier channel, said control channels being normally inactive and becoming active to initiate the transmission of any code, the continued transmission of codes being dependent upon the reception of an answer-back indication over the indication channels from said station, said answer-back indication being transmitted to said office only if all of said control channels become active simultaneously at said station; changeover apparatus to automatically substitute the single spare control channel for any one inoperative control channel, said changeover apparatus including an office changeover relay and a station changeover relay for each control channel except said spare control channel, a hunting relay means at said office and an energizing circuit therefor, and an energizing means for said station changeover relays, each said changeover relay being effective when energized to substitute said spare control channel at that location for the control channel associated with that relay, said hunting relay means being effective when energized to sequentially energize said office changeover relays until said spare control channel is substituted for an inoperative control channel, said energizing circuit being effective to energize said hunting relay means when no answer-back indication is received from said station upon the initiation of a control code, said energizing means at said station including a changeover initiating relay and an energizing circuit for each station changeover relay, said initiating relay becoming energized upon the inititation of a control code if all station changeover relays are deenergized, each said station changeover relay energizing circuit including an energized position contact of said initiating relay and a contact arrangement closed in series only if the associated control channel is inoperative.

5. In combination with a coded carrier remote control system including an office and a station, said system being capable of transmitting control codes from said office to said station and indication codes in the opposite direction, said control codes being transmitted over a first plurality of carrier channels, said indication codes being transmitted over a second plurality of carrier channels, each plurality including a single spare carrier channel, said plurality of indication channels being normally active, said office including a line relay for each of said plurality of indication channels, each line relay having connections to the associated channel to be energized when that channel is active, said station including a code keying circuit for each of said plurality of indication channels, each keying circuit having connections to the associated channel to at times periodically deactivate that channel to transmit a code; changeover apparatus to automatically substitute the single spare indication channel for any one inoperative indication channel, said changeover apparatus including a normally deenergized changeover relay at said office and at said station associated with each indication channel except said spare channel, a detector relay at said office associated with each indication channel except said spare indication channel, each said detector relay being of the magnetic stick type and having normal contacts closed when the corresponding line relay is energized, an energizing circuit for each detector relay including a deenergized position contact of the corresponding line relay and a contact closed only in response to the initiation of a code to operate the detector relay to close reverse contacts, an energizing circuit network for said office changeover relays including normal and reverse contacts of said detector relays and a contact closed only when no code is being transmitted and responsive to a continuous deactivated condition of one indication channel to energize the associated office changeover relay, each office changeover relay being effective when energized to transfer the connections of the corresponding line relay to said spare indication channel and to transfer the connections of said spare line relay to the associated channel, each office changeover relay also being effective when energized to cause a preselected control to be transmitted by a subsequent code to said station over said plurality of control channels, each station changeover relay having connections to said control channels to be energized in response to the preselected control transmitted by the corresponding office changeover relay, each station changeover relay being effective when energized to transfer the connections of the corresponding keying circuit to said spare indication channel and to transfer the connections of the spare channel keying circuit to said associated channel.

6. In combination, a coded carrier remote control system capable of transmitting control and indication codes between a control office and at least one field station, said control codes being transmitted over a first plurality of carrier channels, said indication codes being transmitted over a second plurality of carrier channels, all of the carrier channels being carried on a single communication circuit between said office and said station, each plurality of channels including a single spare carrier channel not normally used for transmitting codes, the control channels except the spare control channel being normally inactive and becoming active on the initiation of transmission of any code, the continued transmission of that code depending upon the reception of an answer-back indication over the indication channels from the station, said answer-back indication being transmitted from said station only if all the normal control channels become active simultaneously to said station, keying means at said office associated with each control channel and having connections thereto, receiving relay means at said station associated with each control channel and having connections thereto, an office changeover relay and a station changeover relay associated with each control channel except said spare control channel, each office changeover relay being effective when energized to transfer the connections of the corresponding keying means from said associated channel to said spare control channel, each station changeover relay being effective when energized to transfer the connections of the corresponding receiving relay means from said associated channel to said spare control channel, a changeover initiating relay at said station energized in response to the initiation of any code only if all station changeover relays are deenergized, an energizing circuit arrangement for said station changeover relays including energized position contacts of said changeover initiating relay and contacts of said receiving relay means arranged to complete a circuit to energize any one of said station changeover relays if the associated control channel is inoperative, a hunting relay means at said office and an energizing circuit therefor responsive to the absence of an answer-back indication when a code is initiated to energize said hunting relay means, said hunting relay means being effective when energized to sequentially energize said office changeover relays until the changeover relay associated with said inoperative control channel is energized, whereby said spare control channel is substituted for said one inoperative control channel and the initiated code is transmitted.

References Cited in the file of this patent

UNITED STATES PATENTS

| | | |
|---|---|---|
| 1,787,511 | Clapp | Jan. 6, 1931 |
| 2,135,295 | Stewart et al. | Nov. 1, 1938 |
| 2,229,089 | Kinsburg | Jan. 21, 1941 |
| 2,229,108 | Maggio et al. | Jan. 21, 1941 |
| 2,280,009 | Rosensteel | Apr. 14, 1942 |
| 2,398,588 | Miller | Apr. 16, 1946 |
| 2,634,401 | Hill | Apr. 7, 1953 |
| 2,653,998 | Derr | Sept. 29, 1953 |
| 2,686,256 | Albersheim | Aug. 10, 1954 |
| 2,718,589 | Staples | Sept. 20, 1955 |
| 2,802,199 | Albrighton et al. | Aug. 6, 1957 |

FOREIGN PATENTS

| | | |
|---|---|---|
| 679,786 | Great Britain | Sept. 24, 1952 |

OTHER REFERENCES

"Coded Carrier Control System," Manual No. 507, Union Switch & Signal Co., reprinted March 1947 (pp. 39–44 and FIGS. 6, 7 and 8 relied on).